W. Kinkead,
Railroad,
N°535,   Patented Dec. 29, 1837.
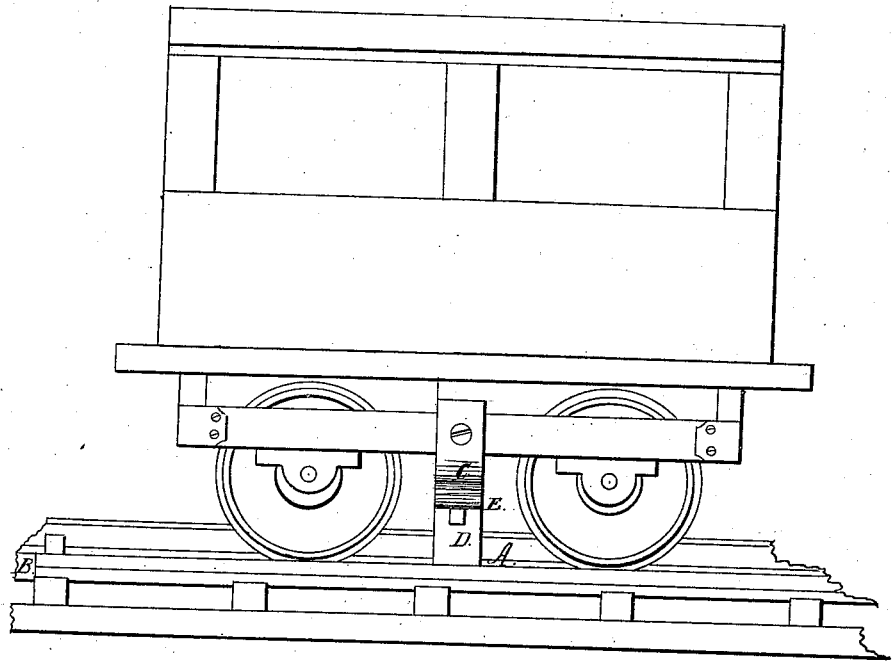
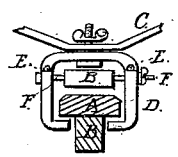

UNITED STATES PATENT OFFICE.

WILLIAM KINKEAD, OF ELKTON, MARYLAND.

SAFETY RAILROAD-CAR.

Specification of Letters Patent No. 535, dated December 29, 1837.

*To all whom it may concern:*

Be it known that I, WILLIAM KINKEAD, of Elkton, Cecil county, State of Maryland, have invented a new and useful Improvement in the Construction of Railroads, called "The Safety Rail to Prevent Cars from Running Off the Track," which is described as follows, reference being had to the annexed drawings of the same, making part of this specification.

This invention consists simply in placing a longitudinal guide bar A laid in the middle of the road between the rails, formed of a piece of timber or iron B, treenailed or bolted to the cross ties or sills of the road; upon the top of which and projecting from 3 to 4 inches over each side is laid and secured by bolts or screws a plate of iron or wood which forms the guide bar A.

Beneath the bottom and in the center of the body of the cars is fixed a broad strap of iron C strongly spiked or bolted to the bed; in the center of which band of iron a strong hook D (of iron is made to extend over the guide bar and turning in below the projecting plate or guide bar with an adequate allowance for the play of the wheels on both sides of the guide bar) attaches the car to the guide bar or safety rail and by this means should there at any time be a disposition of the car wheels to leave the track this strong hook will come in contact with the guide bar and restore the wheels to the true line of the road by rubbing along the under part of the safety rail, the said hook is intended to be put on with strong screw bolts so that it may be removed at pleasure. Each side of the hook may be made with a hinge or joint E, kept in a proper position under the guide bar by means of a screw rod F, passing horizontally through the sides of the hook, the head of the screw-rod being outside of one branch of the hook and the nut outside the other; said joints in the hook and screw rod to close its sides so as to bring the ends under the guide bar are for the purpose of allowing the hook to be engaged or disengaged from the guide bar with despatch. On said screw bolt is an anti-friction roller R.

In the event of an axle or the spokes of any car wheel breaking so as to let the car down upon the track the guide rail will keep the car upon an even and horizontal position, as the guide rail is intended to be but 3 or 4 inches below the bottom or bed of the car so that the car will drop but this height and be brought up on the top of the safety rail, where it will be permitted to move on with safety by being kept in the track until the train may be drawn up without injury to the passengers.

Upon reference to the drawing the full effect of the merits of the invention will be perceived at one glance and its cheapness and practicability in execution will recommend its use upon all public lines of road; besides the great advantage which will be gained in giving permanency to the sleepers and cross sills which connect the rails together it will give confidence and security under the greatest speed which may be resorted to in the conveyance of passengers and lines of express.

The invention claimed by me, the said WILLIAM KINKEAD, and which I desire to secure by Letters Patent, consists—

1. In the method of sustaining the car in case of the breaking of the wheels, axles, &c., in the manner before described.

2. The manner of constructing the safety hook with joints or hinges, screw-rod, and nut, so that said hook can be engaged with or disengaged from the center guide bar or safety rail with great facility and despatch in case of any trivial accident which might arrest the progress of the car, or in case it might be required to turn out of the main track.

WILLIAM KINKEAD.

Witnesses:
WM. P. ELLIOT,
WM. BISHOP.